United States Patent [19]

Baldwin et al.

[11] 4,048,258
[45] Sept. 13, 1977

[54] METHOD FOR PREPARING MOISTURE CURABLE POLYMERS CONTAINING RANDOMLY DISTRIBUTED SITES OF CONJUGATED OLEFINIC UNSATURATION

[75] Inventors: Francis P. Baldwin, Summit; James A. Rae, Cranford; Gary Ver Strate, Matawan, all of N.J.

[73] Assignee: Exxon Research and Engineering Company, Linden, N.J.

[21] Appl. No.: 679,809

[22] Filed: Apr. 23, 1976

Related U.S. Application Data

[63] Continuation of Ser. No. 507,227, March 18, 1974, abandoned.

[51] Int. Cl.$^2$ .................. C08F 255/08; C08F 255/10; C08F 279/02

[52] U.S. Cl. .................. 260/879; 260/887
[58] Field of Search .................. 260/879, 887

[56] References Cited

U.S. PATENT DOCUMENTS

| | | | |
|---|---|---|---|
| 2,662,874 | 12/1953 | Brown | 260/79.5 |
| 3,646,166 | 2/1972 | Canter et al. | 260/879 |

Primary Examiner—John Kight, III
Attorney, Agent, or Firm—Henry E. Naylor

[57] ABSTRACT

Disclosed is a method of preparing a moisture curable elastomer by reacting an elastomer containing randomly distributed sites of conjugated olefinic unsaturation with a cyclic unsaturated anhydride then blending the reaction product with a polyvalent metal compound and, optionally, a basic hydrolysis catalyst.

29 Claims, No Drawings

METHOD FOR PREPARING MOISTURE CURABLE POLYMERS CONTAINING RANDOMLY DISTRIBUTED SITES OF CONJUGATED OLEFINIC UNSATURATION

BACKGROUND OF THE INVENTION

This is a continuation of application Ser. No. 507,227, filed Sept. 18, 1974, now abandoned.

This invention relates to a novel method for making moisture curable polymers, and, in particular, to moisture curable butyl rubber. These moisture curable elastomers are made by reacting a polymer containing conjugated olefinic unsaturation with a cyclic unsaturated anhydride, then blending the reaction product with a polyvalent metal compound and, optionally, a basic hydrolysis catalyst wherein the polyvalent metal compound is an oxide, hydroxide or an alkoxide.

It is known in the art that a moisture curable EPDM may be formed by grafting selected silane monomeric compounds onto the backbone of an unsaturated EPDM. This forms a graft copolymer, or an adduct to the basic polymeric backbone. Specifically, U.S. Pat. No. 3,503,943 discloses the method of synthesis for these silane modified EPDM's.

It is also known in the art that reaction of butyl rubber containing conjugated olefinic unsaturation with maleic anhydride produces the bicyclic adduct illustrated in principle below:

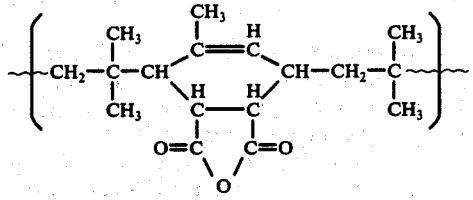

This adduct can then be hydrolyzed to form the dicarboxylic acid and this, in turn, can be reacted with a metal salt or amine to give the ionomer. See U.S. Pat. No. 3,646,166, which is incorporated herein by reference.

It has now surprisingly been found that a moisture curable butyl rubber can be prepared from a butyl rubber containing conjugated olefinic unsaturation without the need for silane modification.

The products of this invention are useful for coatings, linings, caulks and sealants, and the fabrication of elastomeric articles which conventionally are cured in steam autoclaves (e.g., hose, sheeting, insulated wire, etc.).

SUMMARY OF THE INVENTION

Moisture curable butyl rubber can now be made by reacting a butyl rubber containing conjugated olefinic unsaturation, herein referred to as CDB, with maleic anhydride under anhydrous conditions, and blending the reaction product with a polyvalent metal compound and optionally a basic hydrolysis catalyst. In particular, a halogenated butyl rubber is dehydrohalogenated to form conjugated double bonds. This dehydrohalogenated product is then reacted with maleic anhydride to form a butyl rubber with cyclic anhydride groupings grafted thereon. The polymer so formed may then be made moisture curable by blending it with a polyvalent metal oxide, hydroxide or alkoxide, when a basic hydrolysis is not employed or a polyvalent metal oxide or hydroxide when a basic hydrolysis catalyst is employed. Other ingredients which can alter the rate of curing and/or the properties of the uncrosslinked and crosslinked material may also be employed.

DETAILED DESCRIPTION

The expression "butyl rubber" as employed in the specification and claims is intended to include copolymers made from a polymerization reacted mixture having therein from 70 to 99.5% by weight of an isoolefin which has about 4 to 7 carbon atoms, e.g. isobutylene and about 30 to 0.5% by weight of a conjugated multiolefin having from about 4 to 14 carbon atoms, e.g. isoprene. The resulting copolymer contains 85 to 99.5% by weight of combined isoolefin and 0.5 to 15% of combined multiolefin.

Butyl rubber generally has a Staudinger molecular weight of about 20,000 to about 500,000, preferably about 25,000 to about 400,000, especially about 100,000 to about 400,000, and a Wijs Iodine No. of about 0.5 to 50, preferably 1 to 15. The preparation of butyl rubber is described in U.S. Pat. No. 2,356,128 which is incorporated herein by reference. More recently, semi-liquid butyl rubber have been prepared at number average molecular weight of 5,000–20,000 g/mole.

For the purposes of this invention, it is preferred that the butyl rubber have incorporated therein from about 0.5 to 6% of combined multiolefin, more preferably 0.5 to 4%, e.g. 2% for high molecular weight elastomers and about 3 to 4% for the lower molecular weight, semi-liquid elastomers having number average molecular weights in the 5,000–20,000 g/mole range.

The first step in the preparation of butyl rubber ionomers involves the dehydrohalogenation of halogenated butyl rubber. Halogenated butyl rubber is commerically available and may be prepared by halogenating butyl rubber in a solution containing between 1 to 60% by weight of butyl rubber in a substantially inert $C_5$–$C_8$ hydrocarbon solvent such as pentane, hexane, heptane, etc. and contacting this butyl rubber cement with a halogen gas for a period of about 2–25 minutes whereby halogenated butyl rubber and a hydrogen halide are formed, the copolymer containing up to one halogen atom (and sometimes more, especially in the case of bromine) per double bond initially present in the copolymer. The preparation of halogenated butyl rubbers is old in the art, see e.g. U.S. Pat. No. 3,099,644 which is incorporated herein by reference. The invention is not intended to be limited in any way by the manner in which butyl rubber is halogenated and both chlorinated and brominated butyl rubber are suitable for preparing the butyl containing conjugated olefinic unsaturation.

Illustrative of halogenated butyl rubber is Enjay Butyl HT 10-68 (a chlorinated butyl rubber which before halogenation analyzes 1.8 mole % unsaturation and a viscosity-average molecular weight of about 450,000). However, for the purposes of this invention, it is preferred that the high molecular weight butyl rubber starting material have incorporated therein from about 0.5 to 6% of combined diolefin, more preferably 0.5 to 3%, e.g., about 2%.

Conventional high molecular weight butyl rubber generally has a number average molecular weight of about 25,000 to about 500,000, preferably about 80,000 to about 250,000, especially about 100,000 to about 225,000, and a Wijs Iodine No. of about 0.5 to 50, preferably 1 to 15. More recent low molecular weight polymers are prepared to have number average molecular weights of from 5,000 to 20,000 and unsaturation, expressed as mole %, of 2-10.

More recently, butyl type polymers have been prepared having unsaturation of about 5 to about 40 weight %. See, for example, U.S. Pat. No. 3,808,177 incorporated herein by reference for a detailed description of the polymers and their method of preparation. Hence, the useful polymers of this invention comprises copolymers of about 70 to about 99.5 isoolefins of about 4 to 7 carbon atoms having combined about 0.5 to about 30 weight percent of a conjugated diolefin. The preferred diolefins are isoprene, piperylene, and cyclopentadiene or mixtures thereof. Where the polymer contains more than 1% by weight of combined diolefin, not all of the sites of unsaturation need be halogenated prior to the dehydrohalogenation step of the invention. Where desired, however, the polymer may be fully halogenated at all sites of unsaturation. Methods of halogenating or dehydrohalogenating polymers of less than 15% unsaturation are applicable to the more highly unsaturated polymers.

In its preferred embodiment, a major part of the unsaturation of the copolymers of this invention is of the conjugated diene type. However, where the copolymer initially contains more than 1 mole percent of combined diolefin, it is not necessary fully to halogenate all sites of unsaturation. In such polymers, it is preferred that about 1 to about 3% by weight of unsaturation is halogenated. Polymers prepared in such a manner may contain after dehydrohalogenation about 2 to about 30% unsaturation from initially combined diolefin which is not of the conjugated diene type. Preferably, where the polymer comprises about 0.5 to about 3% by weight combined diolefin, substantially all of the unsaturation is halogenated and subsequently dehydrohalogenated to produce a copolymer with a major part of its unsaturation of the conjugated olefinic type.

Dehydrohalogenation is a known chemical reaction and reagents commonly used are listed, for example, on p. 1308 of "Reagents for Organic Synthesis" by Louis F. and Mary Fieser (John Wiley and Sons, Inc., New York, 1967). Among these are, for example, 5-butylamine, N,N-dimethylformamide, calcium carbonate, potassium t-butoxide, sodium iodide in 1,2-dimethoxyethane, etc.

These methods and reagents have been employed with low molecular weight materials where homogeneous contacting of the material to be dehydrohalogenated with the dehydrohalogenating reagent is effected at high concentration, where compound and reagent solubilization can be effected by the use of polar solvents, e.g., dimethylsulfoxide, ethanol, diethyl ether, etc.

In high polymers where the halogen is present in the polymer only in small percentage, where the polymer is not soluble in highly polar solvents and where the concentration of the halogen containing polymer is limited by the high viscosity of polymer solutions in solvents, these methods of dehydrohalogenation are not suitable for producing the compositions of the present invention. Moreover, even in the case where the dehydrohalogenating reagent is hydrocarbon soluble, undesirable side reactions occur, which prevents formation of the products of this invention.

Dehydrohalogenation results in a butyl rubber having conjugated double bonds, the product later referred to herein as CDB. Not wishing to be limited by any theory of reaction, it is thought that the typical structures in halogenated (isoprene based) butyl rubber may be a mixture of:

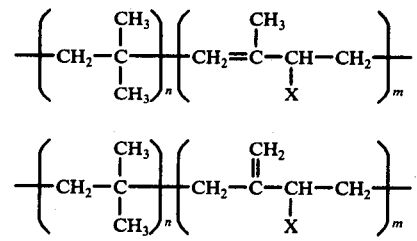

and where $n+1$ and $m$ represent the fraction of isoolefin and conjugated olefin respectively incorporated in the original butyl rubber polymer, and X is halogen. Dehydrohalogenation results in the formation of conjugated double bonds, for example:

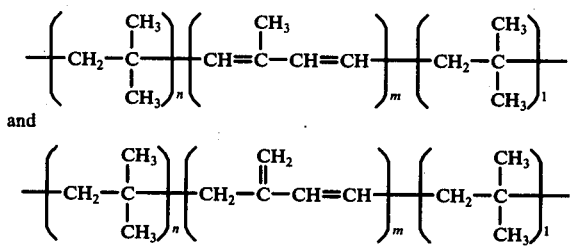

and

An unsaturated anhydride is then reacted with these conjugated double bonds to form a modified butyl rubber. Illustrative of the unsaturated compound which may be used is maleic anhydride.

It will be readily evident to those skilled in the art that the practice of this invention is not limited to butyl rubber; but, applied to any elastomer in which sites of conjugated olefinic unsaturation can be introduced.

Such an elastomer would be an EPDM containing conjugated olefinic unsaturation, the preparation of which is described in U.S. Pat. No. 3,681,309 and incorporated herein by reference.

Also suitable for use in this invention are any polymeric materials containing a cyclic anhydride residue affixed thereto or enchained therein; such residues being in concentrations of about 0.4 to about 10 mole percent. Such materials are applicable whether prepared as discussed above, by copolymerization, or by thermally induced reactions (i.e. 200° C.) of a polymer containing olefinic unsaturation with maleic anhydride (i.e. the so-called "ene" addition, K. Alder, F. Pzscher and A. Schmitz, Berichte Deutsch. Chem. Gesellshaft, 1943, 76, 27.).

Since the reaction of the cyclic unsaturated anhydride, a very reactive dienophile, with the elastomer containing conjugated olefinic unsaturation (herein referred to as a conjugated olefinic elastomer), is a Diels-Alder type reaction, the reaction is spontaneous and no catalyst or excessive heating is necessary; although, acidic materials such as HCl and AlCl$_3$ are known to accelerate some such Diels-Alder reactions as well as the use of heat. Consequently, grafting of the cyclic unsaturated anhydride to the conjugated olefinic elastomer may be carried out subsequent to dehydrohalogenation in the same reaction vessel. Preferably, the modification step is accomplished at a temperature considerably below 200° C., and more preferably between 25° C. to about 150° C. It is noted that a conjugated diene-containing polymer is reacted under anhydrous conditions with up to 1 mol of the cyclic unsaturated anhydride per mol of conjugated units present in the polymer.

The grafting of the unsaturated anhydride to the conjugated olefinic elastomer can also be accomplished by dissolving previously prepared CDB in an inert solvent and then reacting the cyclic unsaturated anhydride with this solution at a temperature of about 25° C. to 150° C. for a time necessary to effect completion of the reaction of the added cyclic unsaturated anhydride with the conjugated olefinic elastomer.

Alternately, the adduct may be prepared by mixing the bulk CDB with maleic anhydride in conventional mixing equipment.

The typical product of the reaction of an acyclic conjugated olefin with a cyclic unsaturated anhydride is illustrated by the following formula:

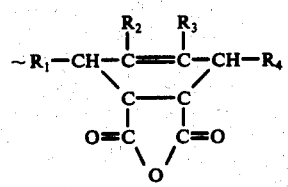

where the cyclic unsaturated anhydride is maleic anhydride and $R_1$, $R_2$, $R_3$ and $R_4$ are hydrocarbon radicals (e.g., alkyl, aralkyl, alkenyl) or hydrogen.

When the most preferred reaction of CDB and maleic anhydride occurs, the following products may be produced:

a)

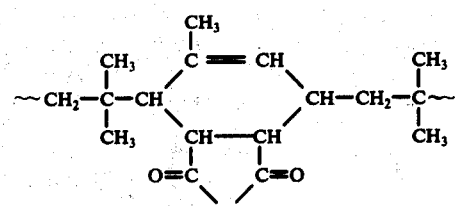

and b)

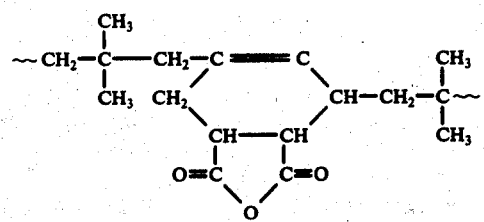

Although not wishing to be bound thereby, it is believed that the chemistry associated with this invention may proceed by the following series of reactions:

Formation of Modified Elastomer (1)

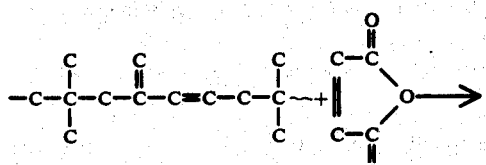

-continued

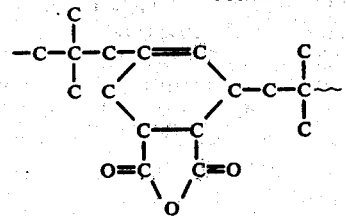

Hydrolysis of the Modified Elastomer (2)

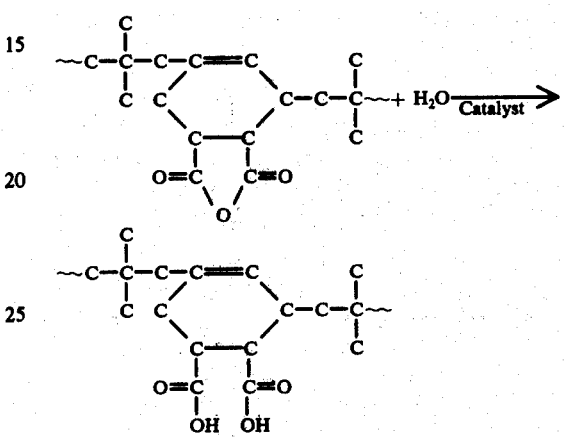

Crosslinking of the Hydrolyzed Product (3)

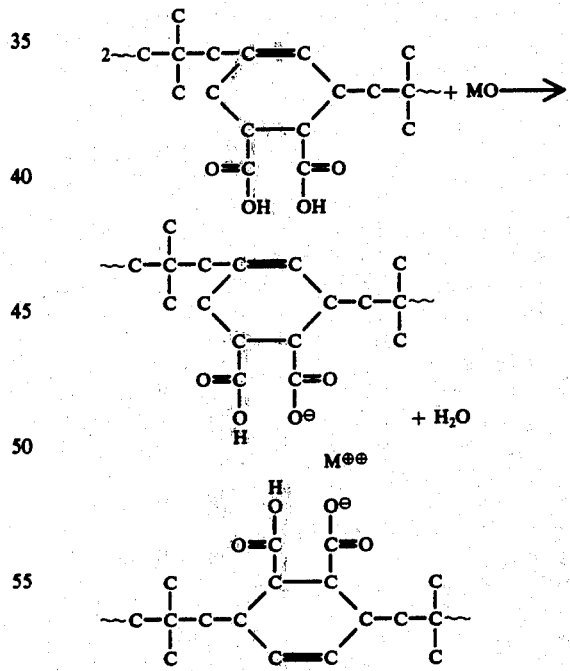

where, in this instance, M is a divalent metal.

While in the foregoing reaction schemes we have suggested a reaction between MO and an aliphatic carboxylic acid, it is possible that this reaction may require conversion of the MO at least at its surface to $M(OH)_2$. Indeed, it was found in separate experiments that the reaction between CaO and naphthenic acid did not appear to take place readily without the addition of some water. This observation in no way influences the matter of inventiveness but merely suggests a possible interposed reaction $MO + H_2O \rightarrow M(OH)_2$ with the $M(OH)_2$ being substituted for MO in reaction (3) and the product $H_2O$ being replaced by $2H_2O$. Thus, in a sense, if this oxide hydrolysis is a requirement when a scrupulously pure MO is employed, the crosslinking process becomes even pure sensitive to water. It is also possible that $M(OH)_2$ would open up a cyclic anhydride ring, the first step of which is depicted below.

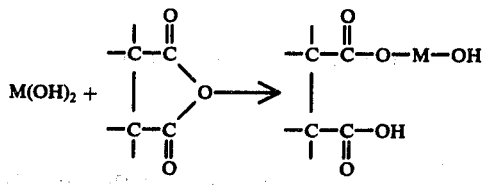

in which case the sensitivity of the crosslinking process would be more contingent on the hydrolysis of the MO rather than the hydrolysis of the anhydride. But, regardless of the mechanism, the inventive concept stands.

In reaction 2, for every anhydride grouping present, one water molecule is required for hydrolysis. Reaction 3 illustrates that the reaction of one pair of carboxylic acid groups in the hydrolyzed material with a divalent metal oxide generates one water molecule for each crosslink formed; this generated water molecule being sufficient to hydrolyze one anhydride molecule - thus giving rise to a self-sustaining system. In the case of a polyvalent metal hydorxide such as $Zn(OH)_2$, two water molecules would result from each crosslink formed. Obviously, elevation of temperature or immersion in water or steam would increase the crosslinking rate.

Moreover, the carboxylic acid salts formed can establish some degree of hygroscopicity and the generation of water in the crosslinking process would enable even thick sections to vulcanize reasonably fast notwithstanding the intrinsic water vapor barrier properties of the butyl molecule. A desirable feature of the system would be that exposed surfaces would crosslink first. Thus, even though the interior might require considerable time to crosslink, surfaces would crosslink or "dry" relatively rapidly.

Crosslinking in the presence of moisture could also be effected by replacement of the simple metal oxides with polyvalent metal alkoxides such as aluminum isopropoxide, aluminum butoxide, titanium propoxide, etc. These may also be used together with a polyvalent metal oxide or hydroxide.

Solvents useful in this invention are substantially inert hydrocarbon and chlorinated solvents. Examples of the substantially inert hydrocarbon solvents which may be used in this invention include such $C_5-C_8$ solvents as pentane, hexane, heptane, cyclohexane, benzene, toluene, mineral spirits and mixtures thereof. Examples of substantially inert chlorinated solvents which may be used in this invention include chloroform, carbon tetrachloride, dichloromethane and perchloroethylene.

Basic hydrolysis catalysts suitable for this invention comprise such catalyst as the tertiary amines such as triethylamine, tributylamine, 2,4,6-tris(dimethylamine)-phenol, 1-azo-3,3,7,7-tetramethylbicyclo(3,3,0)octane (hereafter referred to as Arkam), pyridine, N,N-diethylaniline or any tertiary amine which is soluble in the system in the amounts employed, the amine to be chosen on the basis of its base strength as influenced by known effects of structure. Thus, pyridine would be chosen as a mild catalyst and Arkam as a strong catalyst.

The polyvalent metal oxides, hydroxides and alkoxides which are suitable for the present invention include those oxides, hydroxides and alkoxides of the metals selected from Groups IIa, IIb, IIIa, IVa and IVb, of the Periodic Table of the Elements (see page B-3, *Handbook of Chemistry and Physics*, Chemical Rubber Publishing Co., 47th ed.) Suitable divalent metal ions are, for example, $Be^{+2}$, $Mg^{+2}$, $Ca^{+2}$, $Sr^{+2}$, $Ba^{+2}$, $Cd^{+2}$, $Hg^{+2}$, $Pb^{+2}$ and $Zn^{+2}$. Suitable trivalent and tetravalent metal ions are $Al^{+3}$, and $Ti^{+4}$, both of which can be prepared in alkoxide form and would be ineffective in oxide form.

In general, any polyvalent metal whose hydroxide can be described as being basic or amphoteric and which in that form can react with a carboxylic acid to form a metal salt or any polyvalent metal in alkoxide form can be used. For reasons of cost, toxicity, difficulty in handling, color generations, etc., the preferred metal oxides are those of magnesium, calcium and zinc while the preferred alkoxides are those of aluminum. The alkoxides are known to be stronger bases than the corresponding hydroxides and therefore are generally not used when a basic hydrolysis catalyst is used in this invention.

EXAMPLE 1

A cement was prepared by dissolving 275 grams of conjugated diene butyl rubber (CDB 2358-38-2 containing approximately 1.2 mole % conjugated diene and approximately 0.15 mole % allylic ester) in 4 liters of hexane and mixing in a reciprocating shaker for 24 hours. Next, 6.5 grams of maleic anhydride was added and the mixture left on the shaker for an additional eight days at approximately 100° F. to assure completion of the reaction of the maleic anhydride with CDB. Next a paste of rubber grade ZnO was prepared by hand spatula mulling approximately 4 grams of ZnO and 1 gram of Flexon 580 (an extender oil).

A 25 ml aliquot of the rubber cement was placed in a 1 oz. ointment jar and left to stand for 40 days. At the end of 40 days, no evidence of crosslinking was observed.

EXAMPLE 2

Following the procedure of Example 1, a 25 ml aliquot of rubber cement was placed in a 1 oz. ointment jar to which approximately 1 drop of water and 1 drop of Arkam (described previously) were added. The mixture was stirred and allowed to stand for 40 days. At the end of 40 days, no evidence of crosslinking was observed.

EXAMPLE 3

Following the procedure of Example 1, approximately 0.1 gram of zinc oxide paste was added to an ointment jar containing a 25 ml aliquot of cement. Again, the mixture was stirred to allow for dispersion of the zinc oxide and left to stand for 40 days. At the end of 40 days, there appeared to be no evidence of crosslinking.

EXAMPLE 4

A 25 ml aliquot of the cement and approximately 0.1 g of the zinc oxide paste prepared in Example 1 were placed in an ointment jar along with 1 drop of pyridine (a tertiary amine). Again, the mixture was stirred and allowed to stand. After 20 days gelation of the contents of the ointment jar occurred, indicating that crosslinking had taken place, likely as a result of the presence of adventitious moisture.

EXAMPLE 5

A 25 ml aliquot of the cement and approximately 0.1 grams of the zinc oxide paste prepared in Example 1, were placed in an ointment jar along with 1 drop of water. Again, the mixture was stirred and left standing. Gelation occurred after only 4 days, indicating a moisture curable system.

EXAMPLE 6

A 25 ml aliquot of the cement and approximately 0.1 grams of zinc oxide paste prepared in Example 1, were placed in an ointment jar along with 1 drop of water and 1 drop of Arkam. Again, the mixture was stirred and left to stand. Gelation was observed within 2 hours, indicating that moisture curing was greatly accelerated by the introduction of a strong basic hydrolysis catalyst.

EXAMPLE 7

A 25 ml aliquot of the cement and approximately 0.1 grams of zinc oxide paste as prepared in Example 1 were placed in an ointment jar to which 1 drop of water and 1 drop of pyridine were added. The mixture was stirred and left to stand. Gelation was observed after approximately 6 hours, indicating that pyridine (a weakly basic hydrolysis catalyst) does not accelerate moisture curing as quickly as Arkam (a strongly basic hydrolysis catalyst).

Table I
Gelation Data for Moisture Curable Systems Based on CDB-Maleic Anhydride Adduct

| Exp. # | ZnO Paste | Water | Pyridine | Arkam | Time to Gelation |
|---|---|---|---|---|---|
| 1 | 0 | 0 | 0 | 0 | >40 days |
| 2 | 0 | 1 drop | 0 | 1 drop | >40 days |
| 3 | ~0.1 g | 0 | 0 | 0 | >40 days |
| 4 | ~0.1 g | 0 | 1 drop | 0 | 20 days |
| 5 | ~0.1 g | 1 drop | 0 | 0 | 4 days |
| 6 | ~0.1 g | 1 drop | 0 | 1 drop | 2 hrs |
| 7 | ~0.1 g | 1 drop | 1 drop | 0 | 6 hrs |

While the foregoing examples illustrate the invention in its simplest terms, numerous ways of moderating the rate of ionomeric crosslinking are possible. For example, one might want the product to remain uncrosslinked for a considerable period of time but then to crosslink relatively rapidly. This might be accomplished, for example, by adding to a catalyzed compound an innocuous desiccant or a material which will react quantitatively and rapidly with moisture. Illustrative of such materials would be for respective examples, $CaSO_4$ or an orthoformate ester such as

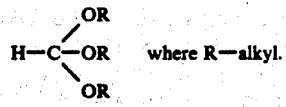

where R—alkyl.

The latter of these react readily with water as below.

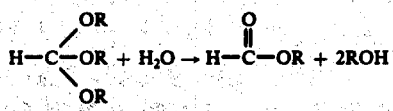

and, properly chosen, (e.g., methyl or ethyl orthoformate) the product esters and alcohols would readily evaporate from the system or at worst the alcohols would form some half ester with the cyclic anhydride, viz.

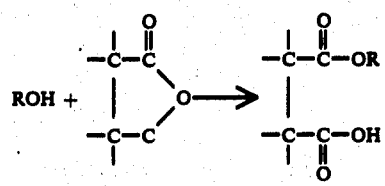

leaving one carboxylic acid group at each potential ionomeric crosslinking site.

As stated previously, dry calcium oxide does not react readily with carboxylic acids, but the addition of water does cause the reaction to proceed readily. Since calcium oxide is also a good dessicant (forming $Ca(OH)_2$ when reacted with water), its use would represent a case in which a single chemical species provides both for moderation of reaction and later participation in the crosslinking process.

Thus, the system is subject to numerous control features involving such things as the amount and base strength of catalyst employed, the hygroscopicity of the system (e.g., some fillers, e.g., acidic clays, absorb moisture readily), the presence of desiccants or materials which react with water faster than the anhydride (or metal oxide or alkoxide) can be hydrolyzed and so forth.

Examples 8-10

The following ingredients were used:
| | |
|---|---|
| CDB* | 100.0 grams |
| HAF Black | 50.0 |
| Flexon 840 Oil | 15.0 |
| Maleic Anhydride | 4.0 |
| Calcium Oxide | 2.2 |
| t-Amine (Arkam) | 0.35 |

*CDB prepared from Enjay Butyl HT-1068.

The polymer, black oil and CaO were mixed conventionally on a rubber mill. The masterbatch plus maleic anhydride was dissolved in toluene and shaken for 10 days. A portion of the cement to which the t-amine had been added was shaken overnight then poured in glass plate molds. The toluene was allowed to evaporate at room temperature. After 24 hours, the resulting film was tack free, and after 6 days the physical properties were tested.

Physical Properties — 0.020 inch films exposed on one side.

| Experiment | 8 | 9 | 10 |
|---|---|---|---|
| Curing | 6 days at R.T. + ≈ 50% R.H. | 6 days at R.T. + 100% R.H. | 6 days at R.T. + 19 Hrs. Live (Atmospheric Pressure) Steam |
| Hardness, Shore A | 46 | — | 57 |
| 100% Modulus, psi | 85 | 120 | 290 |
| 300% Modulus, psi | 110 | 245 | 1500 |
| 500% Modulus, psi | 220 | 630 | — |
| Tensile Strength, psi | 840 | 1135 | 2690 |
| Elongation, % | 1100 | 760 | 490 |

Examples 11-13

The following ingredients were used:

| Experiment | 11 | 12 | 13 |
|---|---|---|---|
| CDB* | 100.0 | 100.0 | 100.0 |
| HAF Black | 50.0 | 50.0 | 50.0 |
| Flexon 580 (extender oil) | 15.0 | 15.0 | 15.0 |
| Maleic Anhydride | 1.65 | 1.65 | 1.65 |
| ZnO | 4.7 | 9.4 | — |
| Zn(OH)$_2$ | — | — | 6.0 |
| t-Amine (Arkam) | 0.1 | 0.1 | 0.1 |

The polymer, black oil and metallic base were mixed conventionally on a rubber mill. This mixture plus the maleic anhydride were dissolved in toluene and shaken for 7 days to form a cement. A portion of this cement to which the t-amine has been added was shaken overnight, then poured into glass plate molds. The films were tack free within 24 hours, and the physical properties were tested after 6 days as indicated below.

Physical Properties
0.020 inch films exposed on one side

| Experiment | 11 | | 12 | | 13 | |
|---|---|---|---|---|---|---|
| Curing (6 days ≈ 50% R.H.) | At R.T. | At R.T. + 7 Hrs. in 100° C. Steam | At R.T. | At R.T. + 7 Hrs. in Steam | At R.T. | At R.T. + 7 Hrs. in Steam |
| 100% Modulus, psi | 165 | 470 | 200 | 460 | 200 | 575 |
| 300% Modulus, psi | 630 | 1485 | 720 | 1340 | 800 | 1660 |
| 500% Modulus, psi | 1440 | — | 1500 | — | 1680 | — |
| Tensile Strength, psi | 1820 | 2100 | 1820 | 1865 | 2040 | 2300 |
| Elongation, % | 605 | 460 | 600 | 425 | 610 | 490 |

*CDB Prepared from Enjay Butyl ® HT-1068.

What is claimed is:

1. A method for preparing an elastomeric polymer, curable by addition of a catalytic amount of water which comprises reacting a polymer containing randomly distributed sites of conjugated olefinic unsaturation, under anhydrous conditions, with up to 1 mol of a cyclic unsaturated anhydride per mol of conjugated units present in the polymer, then blending the reaction product with a polyvalent metal compound wherein the polyvalent metal compound is an oxide, hydroxide or alkoxide.

2. The method of claim 1 wherein the polymer containing randomly distributed sites of conjugated olefinic unsaturation is butyl rubber containing said unsaturation.

3. The method of claim 1 wherein the cyclic unsaturated anhydride is maleic anhydride.

4. The method of claim 1 wherein the polyvalent metal compound is an oxide or hydroxide of a metal selected from the group consisting of metals in Groups IIa and IIb or an alkoxide of a metal selected from the group consisting of metals in Groups IIIa and IVb of the Periodic Table of the Elements.

5. The cured product of claim 1.

6. A method for preparing an elastomeric polymer, curable by addition of a catalytic amount of water, which comprises reacting a polymer containing randomly distributed sites of conjugated olefinic unsaturation under anhydrous conditions with up to 1 mol of a cyclic unsaturated anhydride per mol of conjugated units present in the polymer, then blending the reaction product with a polyvalent metal compound and a basic hydrolysis catalyst wherein the polyvalent metal compound is an oxide or a hydroxide.

7. The method of claim 6 wherein the polymer containing randomly distributed sites of conjugated olefinic unsaturation is butyl rubber containing said unsaturation.

8. The method of claim 6 wherein the cyclic unsaturated anhydride is maleic anhydride.

9. The method of claim 6 wherein the polyvalent metal compound is an oxide or hydroxide of a metal selected from the group consisting of metals in Groups IIa, IIb of the Periodic Table of the Elements.

10. A method for preparing a butyl polymer, curable by addition of a catalytic amount of water, having a number average molecular weight of about 5,000 to about 250,000 which comprises:
  a. dissolving a butyl polymer containing randomly distributed sites of conjugated olefinic unsaturation in a substantially inert solvent;
  b. reacting the polymer solution of (a) at a temperature of about 25° C. to about 150° C. with up to 1 mol of cyclic unsaturated anhydride per mol of conjugated olefinic units present in the polymer; and
  c. blending the reaction product of (b) with a polyvalent metal oxide or hydroxide of a metal selected from the group consisting of metals in Groups IIa and IIb or an alkoxide of a metal selected from the groups consisting of metals in Group IIIa and IVb of the Periodic Table of the Elements.

11. The method of claim 10 wherein the cyclic unsaturated anhydride is maleic anhydride.

12. The method of claim 10 wherein the polyvalent metal is ZnO.

13. The method of claim 10 wherein the substantially inert solvent is a $C_5$-$C_8$ hydrocarbon selected from the group consisting of pentane, hexane, heptane, cyclohexane, mineral spirits, benzene, toluene and mixtures thereof.

14. The method of claim 10 wherein the substantially inert solvent is a chlorinated solvent selected from the group consisting of chloroform, carbontetrachloride, dichloromethane and perchloroethylene.

15. A method for curing, with a catalytic amount of water, an elastomer containing randomly distributed sites of conjugated olefinic unsaturation which comprises:
  a. reacting an elastomer containing randomly distributed sites of conjugated olefinic unsaturation, under anhydrous conditions, with up to 1 mol of a cyclic unsaturated anhydride per mol of conjugated olefinic units present in the polymer;
  b. blending the reaction product of (a) with a polyvalent metal compound wherein the polyvalent metal compound is an oxide or hydroxide; and
  c. reacting the blend of (b) with a catalytic amount of water.

16. The method of claim 15 wherein the elastomer containing randomly distributed sites of conjugated olefinic unsaturation is butyl rubber containing said unsaturation.

17. The method of claim 15 wherein the cyclic unsaturated anhydride is maleic anhydride.

18. The method of claim 15 wherein the polyvalent metal compound is an oxide or hydroxide of a metal selected from the group consisting of metals of Group IIa and IIb of the Periodic Table of the Elements.

19. The method of claim 15 wherein a basic hydrolysis catalyst is included.

20. An elastomeric polymer, which is curable by a catalytic amount of water, which comprises:
  a. the adduct obtained by reacting a polymer containing randomly distributed sites of conjugated olefinic unsaturation with up to 1 mol of a cyclic unsaturated anhydride per mol of conjugated olefinic units present in the polymer; and
  b. a polyvalent metal compound wherein the polyvalent metal compound is an oxide, hydroxide or alkoxide.

21. The moisture curable polymer of claim 20 wherein the polymer containing randomly distributed sites of conjugated olefinic unsaturation is butyl rubber containing said unsaturation.

22. The moisture curable polymer of claim 20 wherein the cyclic unsaturated anhydride is maleic anhydride.

23. The moisture curable polymer of claim 20 wherein the polyvalent metal compound is an oxide or hydroxide of a metal selected from the group consisting of metals of Groups IIa and IIb of the Periodic Table of the Elements.

24. The moisture curable polymer of claim 20 wherein a basic hydrolysis catalyst is included.

25. The polymer according to claim 24, wherein the basic hydrolysis catalyst is a tertiary amine.

26. A butyl polymer, which is curable by a catalytic amount of water, having a number average molecule weight of about 5,000 to about 250,000 which comprises:
  a. the adduct obtained by reacting a butyl polymer containing randomly distributed sites of olefinic unsaturation with maleic anhydride; and
  b. a polyvalent metal oxide, hydroxide or alkoxide.

27. The moisture curable butyl polymer of claim 26 wherein the polyvalent metal oxide is ZnO.

28. The moisture curable butyl polymer of claim 26 wherein a basic hydrolysis catalyst is included.

29. The moisture curable butyl polymer of claim 28 wherein the basic hydrolysis catalyst is a tertiary amine.

* * * * *